(No Model.)
P. MEDART.
PULLEY FITTING TABLE.
No. 257,964. Patented May 16, 1882.
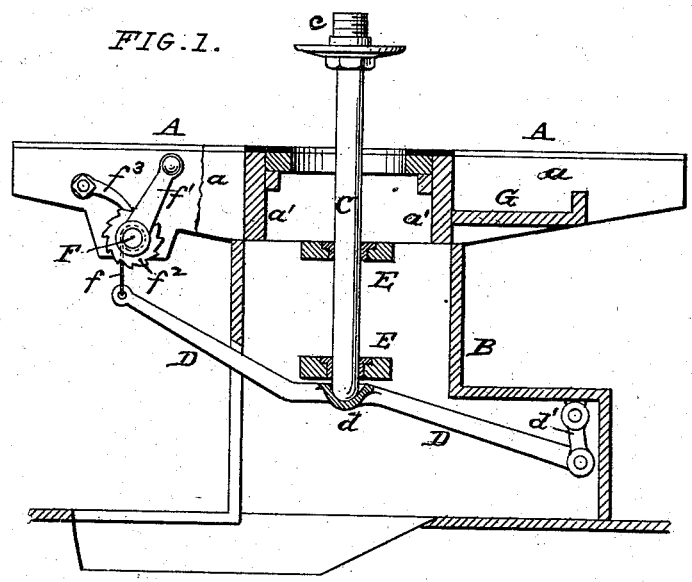
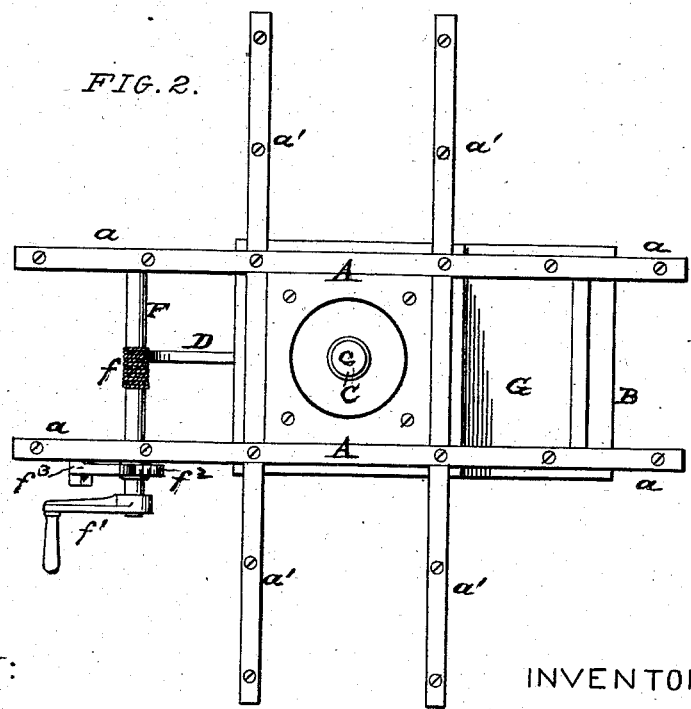
ATTEST:
Robert Burns
INVENTOR:
Philip Medart

UNITED STATES PATENT OFFICE.

PHILIP MEDART, OF ST. LOUIS, MISSOURI, ASSIGNOR OF ONE-HALF TO WILLIAM MEDART, OF SAME PLACE.

PULLEY-FITTING TABLE.

SPECIFICATION forming part of Letters Patent No. 257,964, dated May 16, 1882.

Application filed September 5, 1881. (No model.)

*To all whom it may concern:*

Be it known that I, PHILIP MEDART, a citizen of the United States, residing at the city of St. Louis, in the State of Missouri, have invented certain new and useful Improvements in Pulley-Fitting Tables, of which the following is a specification.

The present invention relates to the construction of a machine for fitting together in an accurate and convenient manner the rim and spider or center of that class of belt-pulleys known to the trade as "composite pulleys," in which the rim is made separate from the spider or center and the two are subsequently fitted together by means of rivets or bolts.

In connection with a suitable table, I provide an adjustable arbor, standing in a plane at right angles to the face of the table, and having provision for holding the pulley-spider so that the same can be adjusted to any required height (depending entirely upon the width of rim to which the spider is being fitted) and on a plane parallel with the face of the fitting-table, so as to insure an even parallel fitting of the rim, which rim rests upon or against the face of the table, as will hereinafter more fully appear.

In the accompanying drawings, Figure 1 is a vertical section, and Fig. 2 a top view, of my machine.

A is the table, preferably composed of two pairs of bars, a a', crossing each other, as shown, forming a skeleton frame which allows of easy access of the operator to the center of the table in fitting small pulleys. The table is supported upon a base, B, of any suitable form and construction. At the center of the table, and in a plane at right angles to the face of the same, is arranged an adjustable arbor, C, capable of a rotative movement in the step or cup-shaped bearing d of the adjusting-lever D, so as to allow of the pulley parts being turned around in fitting them together. The arbor C is guided in a true vertical direction by guides E E, as shown, and at top is provided with a screw-threaded head, c, to which the chuck or mandrel that carries the pulley-spider is attached, so as to hold the spider firmly on the arbor. The adjusting-lever D is pivoted by a link-hanger, d', so as to permit of a movement of the step-bearing d up and down in a straight line, and said lever is adjusted by means of a winding-drum, F, and rope f, as clearly indicated in the drawings. The drum F is provided with an operating-handle, f', and a ratchet-wheel, f², that is engaged by a pawl or dog, f³, so as to lock the parts in the required position.

While the table A is shown as in a horizontal position and the arbor C in a vertical position, yet it is evident that their respective positions can be reversed without departing from the spirit of my invention; but the form shown is preferable.

G is a tool-tray formed at one side of the machine, between the bars a a, as shown.

The mode of operation of this machine is as follows: The spider or center of the pulley is attached to the arbor C by means of its holding chuck or mandrel, and the rim, as it comes from the bending-rolls, is placed around it and rests upon the face of the table. The spider is then adjusted to the middle of the rim, after which draw-bands are applied to the outside of the rim, so as to firmly clamp it onto the spider, ready for the succeeding operation in the completion of the pulley.

Having thus described my said improved pulley-fitting table, what I claim as new therein, and desire to secure by Letters Patent, is—

1. The combination, with the pulley-fitting table A, of an adjustable rotary arbor, C, arranged in a plane at right angles to the face of the table, and provided with a spider-holding head, c, and an adjustable step-bearing, d, for the arbor C, substantially as and for the purpose set forth.

2. The combination of the table A, arbor C, lever D, with its step-bearing d, link d', adjusting-drum F, and rope f, substantially as and for the purpose set forth.

In testimony whereof witness my hand, at St. Louis, Missouri, this 2d day of September, 1881.

PHILIP MEDART.

In presence of—
ROBERT BURNS,
WM. MEDART.